C. R. RADCLIFFE.
POWER TRANSMITTING APPARATUS.
APPLICATION FILED AUG. 12, 1916.

1,271,079.

Patented July 2, 1918.
2 SHEETS—SHEET 1.

WITNESS

INVENTOR.
C. R. Radcliffe
BY
his ATTORNEY

C. R. RADCLIFFE.
POWER TRANSMITTING APPARATUS.
APPLICATION FILED AUG. 12, 1916.

1,271,079.

Patented July 2, 1918.
2 SHEETS—SHEET 2.

WITNESS

INVENTOR.
C. R. Radcliffe
BY
ATTORNEY

UNITED STATES PATENT OFFICE.

CARLTON R. RADCLIFFE, OF NEW YORK, N. Y.

POWER-TRANSMITTING APPARATUS.

1,271,079. Specification of Letters Patent. Patented July 2, 1918.

Application filed August 12, 1916. Serial No. 114,513.

*To all whom it may concern:*

Be it known that I, CARLTON R. RADCLIFFE, a citizen of the United States, and a resident of the city of New York, in the county of New York and State of New York, have invented certain new and useful Improvements in Power-Transmitting Apparatus, of which the following is a specification.

The present invention relates to a power transmitting mechanism. It pertains more particularly to devices of the type known as "planetary gear and power transmitting apparatus." In these devices power is transmitted from a driving shaft or member to a driven shaft or member by a train of gears, the transmitting mechanism becoming operative as soon as one or more of the elements of the train are caused to change their normal speed relative to the other elements thereof. For the purpose of effecting such change in speed, manually operated means are usually employed, which in most cases require careful manipulation.

The main object of the present invention is to provide automatic means for effecting the required change in speed between the elements of the planetary gear, thereby permitting the driving member to impart, without shock or jar, rotation to the driven member.

With these and other objects in view, which will more fully appear as the nature of the invention is better understood, the same consists in the combination, arrangement, and construction of parts hereinafter described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

One of the many possible embodiments of the invention is illustrated in the accompanying drawings, in which:—

Figure 1:
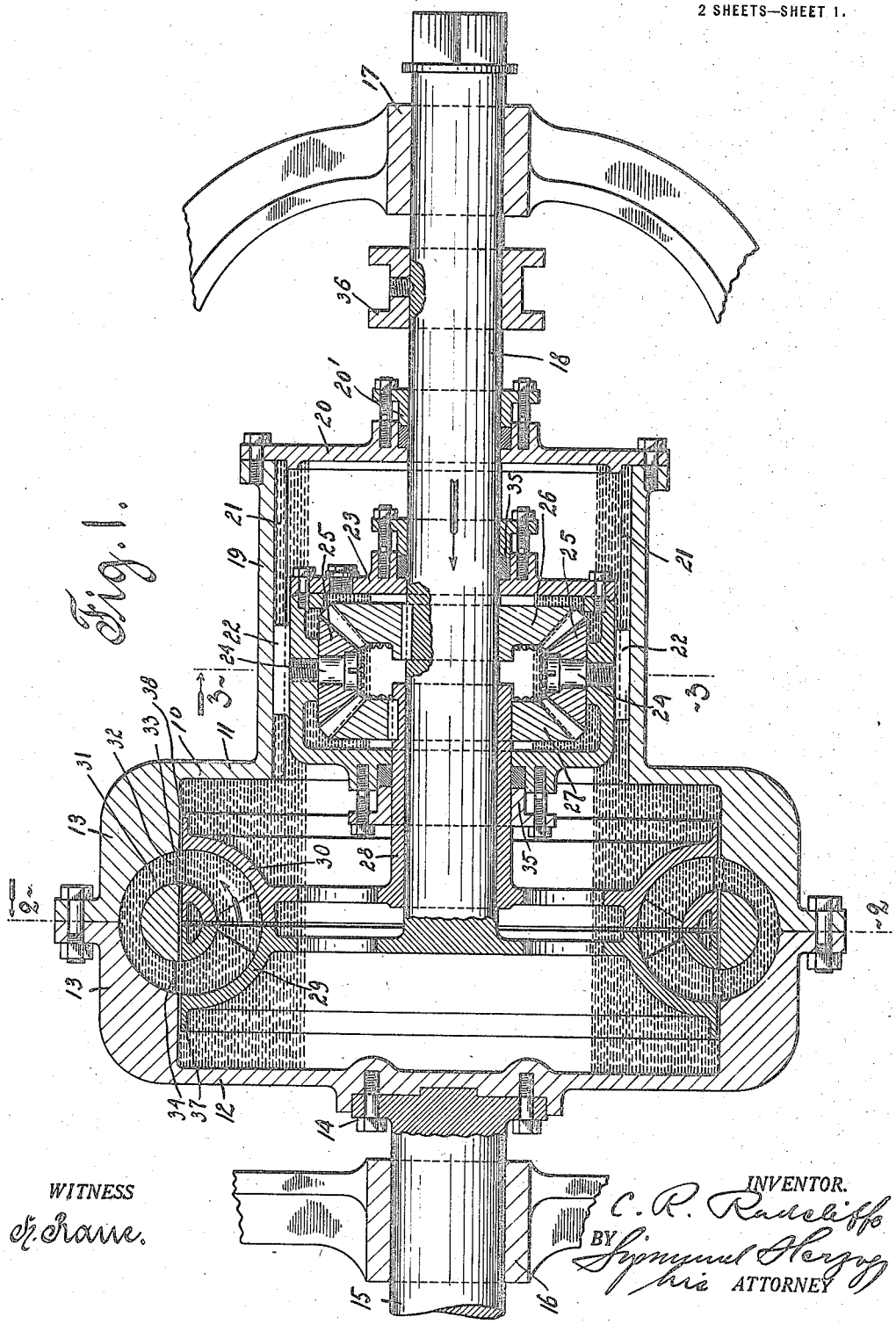
Figure 2:
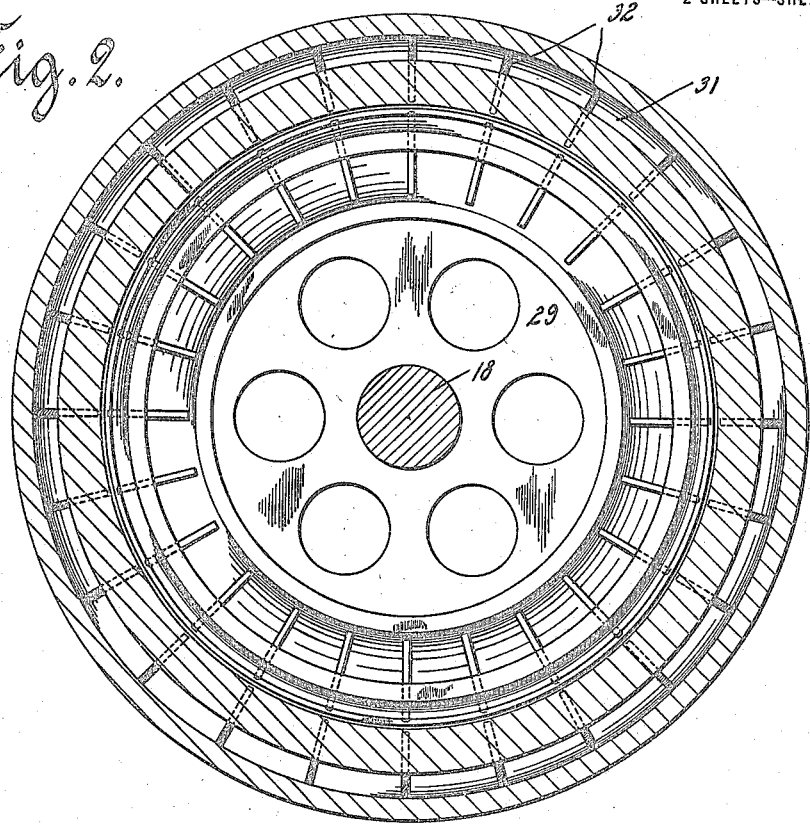
Figure 3:
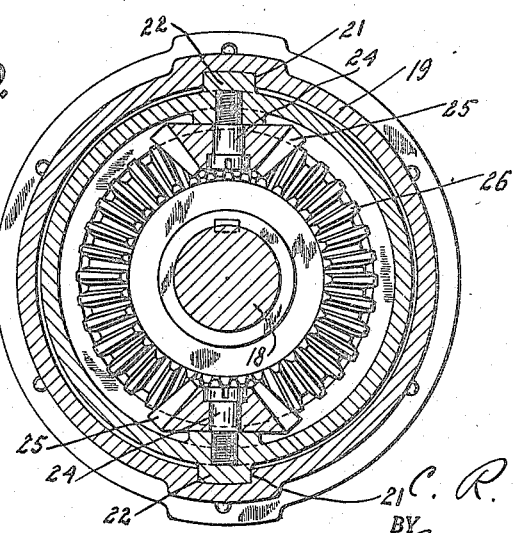

Figure 1 is a central horizontal section taken through a power transmitting apparatus constructed in accordance with this invention; Fig. 2 is a section taken on line 2—2 of Fig. 1; and Fig. 3 is a section taken on line 3—3 of Fig. 1.

In the drawings, the numeral 10 indicates a casing made, in the case illustrated, of two parts 11 and 12, which are suitably bolted together. Both parts are provided with a heavy rim 13, for a purpose hereinafter to be described. This casing is attached, for instance, by screws 14 to a driving shaft 15, for instance, the crank shaft of an internal combustion engine. This shaft is journaled in one or more bearings 16. In alinement with the bearings 16 is disposed a bearing 17, in which is rotatably mounted the driven shaft 18 of the mechanism. The part 11 of the casing is provided with a sidewardly projecting cylindrical extension 19, that is closed by a head 20, with which is associated a stuffing box 20', that encircles the driven shaft. In diametrically opposite portions of the inner face of the extension 19 are formed longitudinal grooves 21, and in these grooves are slidably disposed lugs 22 which are made integral with or attached to a gear box 23.

The connection between the driving and driven shafts is made by a planetary gearing, comprising, in the case illustrated in the drawings, a plurality of bevel gears, connected with the driving and driven shafts in a manner presently to be described. The gearing herein described is shown for purposes of illustration only, as gears of other types may just as well be combined with the mechanism hereinafter to be fully specified. The gearing comprises two spindles 24, which are disposed upon diametrically opposite portions of the gear box or carrier 23, and have each loosely mounted thereon a bevel pinion 25, which constitute the planet gears of the transmission. The gear box 23, by reason of its lugs 22 being seated in the grooves 21, is caused to rotate with the casing 10. The planet gears mesh with bevel gears 26 and 27, the gear 26 being keyed to the driven shaft and the gear 27 being keyed or otherwise fixed to a sleeve 28, that is drawn over the said driven shaft, and is adapted to rotate thereon. The axes of the gears 26 and 27 are in alinement, and are disposed at right angles to the longitudinal axes of the spindles 24, as clearly appears from Fig. 1 of the drawings. In this manner a planetary gearing of the well-known type is formed, said gearing being combined with means which has a tendency to retard the rotative speed of the sleeve 28 as rotation is imparted to the same by the driving shaft through the intermediary of the planetary gearing. This means comprises, in the case illustrated, a hydraulic clutch, including three heads 29, 30, and 31. The heads 29 and 30 are alike or similar in design, the former being made integral with or fixedly attached to the driven shaft, and the other being carried by the sleeve 28. The heads 29 and 30 are each constructed like the impeller of a centrifugal pump, both coöperating, as hereinafter to be described, with the head 31, that is formed in the heavy rim portions 13 of the casing.

The head 31 comprises a plurality of curved passages that are formed in the said rim portion and bounded by radially disposed straight blades 32. The blades of the heads 29 and 30 are also straight and also radially disposed, as clearly appears from Fig. 2 of the drawings. The inlets 33 and outlets 34 of the passages in the head 31 are disposed equidistantly from the longitudinal axis of the driving shaft. The heads 29 and 30 are located within the casing, and are mounted relative to each other and in relation to the head 31 in such a manner that they form, together with the head 31, a closed circuit in which the liquid circulates, the liquid discharged by one head flowing into another one of the set. The casing 10 is either wholly or partly filled with a suitable liquid, which, as the casing is being rotated, flows always from a faster moving head into a slower one, more particularly, the faster moving head will discharge the liquid in jets or streams, said jets flowing into the slower moving head, which discharges the liquid, to be drawn into the faster moving head. Attention is called to the fact that the head 31, in itself, does not cause a circulation of the liquid, for the reason that the inlets and outlets of its passages are, as has been specified, disposed at the same distance from the longitudinal axis of the driving shaft. Some means must, therefore, be provided which will induce a circulation of the liquid in the head 31. This means will be described hereinafter.

The carrier 23 is made, in the case illustrated in the drawings, in the form of a gear box, which may be filled with a suitable lubricating material, stuffing boxes 35 being associated with said box for the well-known purpose.

The driven shaft 18 is shiftable in its bearings. For the purpose of shifting the same, there may be provided any suitable means, for instance, there may be attached to it a grooved collar 36, with which coöperates a shifting lever (not shown in the drawings). Inasmuch as the gear 26 is keyed to the driven shaft and this gear is in mesh with the pinions 25, it is obvious that, in shifting the said shaft, the planetary gearing and also the heads 29 and 30 will move therewith. The heads 29 and 30 are provided with oppositely extending flanges 37 and 38, respectively, said flanges being adapted to close or obstruct the inlets and outlets of the passages in the head 31. The purpose of this arrangement will appear hereinafter.

The operation of this device is as follows: The operation of the mechanism will best be understood by assuming that a load is applied to the driven shaft and that the parts are in the positions shown in the Fig. 1 of the drawings, in which the inlets and outlets of the passages in the head 31 are unobstructed. If rotation is imparted to the driving shaft, the carrier 23 and the planet gears 25 thereon will rotate with the said casing. Inasmuch as the planet gears are in mesh with the bevel gear 26 and the latter is stationary, the said planet gears will rotate around their own axes and bodily around the axis of the driven shaft. The stationary gear 26 acts as a fulcrum for the said planet gears and the latter, being in mesh with the bevel gear 27, that is attached to the sleeve 28, will rotate the bevel gear 27 in the direction of rotation of the driving shaft at a speed that is, in the form shown, twice that of the driving shaft. Due to this motion, the liquid in the head 30 is moved toward its periphery and thrown against the blades 32 of the head formed in the casing. The blades 32, moving slower than the head 30, act as an abutment in the same manner as the stationary casing of a hydraulic clutch. The result is that the head 30 slows gradually down. As soon as the speed of the head 30 decreases in relation to the casing of the device, the gear 27 becomes the fulcrum of the planetary gearing with the result that the gear 26 is caused to rotate in the direction of rotation of the gear 27. In this manner, however, the head 29 starts to move, its speed increasing gradually until it is substantially that of the head 30. When these two heads move at substantially the same speed, the driven shaft 18 rotates at approximately the speed of the driving shaft. From this it appears that the speed of the driven member increases gradually from zero to substantially that of the driving member without shock or jar.

It is to be observed that the power consumed in slowing down the head 30 is converted into useful work, as it causes a circulation of the liquid through the passages in the casing. The liquid flows in jets from the passages in the casing into the head 29, and has thus a tendency to increase the speed of the driven shaft. From this it appears that the driving member, *per se*, does not impart energy to the liquid flowing therethrough, but, on the contrary, it tends to absorb and dissipate the energy created in the head 30. Whatever energy remains in the liquid, after leaving the passages in the casing 10, is given up to the head 29.

Attention is called to the fact that, while herein a planetary gearing of a particular type has been described in connection with means for causing automatically one of its elements to become a fulcrum, any other gearing may be used without departing from the invention, which lies mainly in connecting the driving and driven shafts by a train of gears, in combination with means for automatically changing the relative rotative speeds of the elements of the train so that part of the power consumed in changing the speed of one or more elements of the train is converted at the same time into useful work for speeding up the driven shaft. The invention lies furthermore in the provision of means for controlling the flow of the liquid in the circuit, formed by the three members of the hydraulic clutch. If the driven shaft is shifted in the direction of the arrow shown in Fig. 1 of the drawings, it carries with it the heads 29 and 30, and also the gear box 23 and the elements therein. In this manner the flange 38 on the head 30 obstructs the inlets 33 to the passages in the head 31 in the casing. The farther the driven shaft is shifted the more will the inlets to the passages 31 be obstructed, or they may be closed altogether if the flange 38 is brought directly opposite thereto. As the inlets to the passages 31 are being obstructed, obviously, the speed of the driven shaft will gradually decrease, inasmuch as the clutching action of the passages in the casing decreases with reference to the head 30. This head will consequently speed up, and the result will be that the driven shaft will slow down. The same result is obtained if the driven shaft is shifted in the opposite direction, in which case the flange 37 on the head 29 obstructs the outlets of the passages in the casing. If the inlets or the outlets of said passages are fully closed, no transmission of power can take place, as the means for retarding the rotative speed of the fulcrum member of the planetary gearing, that is to say the gear 27, are rendered ineffective.

It will be observed from the foregoing that the transmission of power between the driving and driven members of the apparatus takes place through the planetary gearing, the two pump impellers 29 and 30 and also the blades in the casing acting solely as a hydraulic clutch. They are designed in the form of impellers in order to obtain a continuous circulation of the actuating liquid, whereby the liquid is, due to centrifugal force, caused to move in the head 30 outward and to be thrown against the blades or vanes 32 in the casing, which act as an abutment. The head 29, on the other hand, is designed as an impeller to permit the liquid to flow back therein to the head 30.

The heavy rim portion 13 acts as a flywheel for the driving shaft.

What I claim is:

1. The combination with driving and driven shafts, of a gearing connecting the same, and an automatically acting hydraulic clutch for causing one element of the gearing to become a fulcrum for certain other elements thereof, said clutch including three members each of which is connected with an element of said gearing.

2. The combination with driving and driven shafts, of a planetary gearing connecting the same, and an automatically acting hydraulic clutch for causing one element of the gearing to become a fulcrum for certain other elements thereof, said clutch including three members each of which is connected with an element of said gearing.

3. The combination with driving and driven shafts, of a gearing connecting the same, and an automatically acting hydraulic clutch for changing the normal speed of one element of the gearing in relation to other elements thereof whereby the same is caused to become the fulcrum for certain other elements of the gearing, said clutch including three members, one of which is connected with the element which becomes the fulcrum, another one with the driving shaft and the third one with the driven shaft.

4. The combination with driving and driven shafts, of a planetary gearing connecting the same, and an automatically acting hydraulic clutch for changing the normal speed of one element of the gearing in relation to other elements thereof whereby the same is caused to become the fulcrum for certain other elements of the gearing, said clutch including three members, one of which is connected with the element which becomes the fulcrum, another one with the driving shaft and the third one with the driven shaft.

5. The combination with driving and driven shafts, of a planetary gearing associated therewith, said gearing including driving and driven members and an intermediate fulcrum member, the driving member being connected with the driving shaft and the driven member of said gearing with said driven shaft, and a hydraulic clutch connected with said gearing, said clutch including three elements, one of which is connected with said driving shaft, another one with said driven shaft and the third one with said intermediate fulcrum member.

6. The combination with driving and driven shafts, of a gearing associated therewith, said gearing including driving and driven members and an intermediate fulcrum member, a hydraulic clutch connected with said gearing, said clutch including three elements, one of which is connected with said driving shaft, another with said driven shaft and the third one with said intermediate fulcrum member, each clutch element comprising a passaged head arranged in a manner that their passages constitute the circuit in which the liquid flows, the passages of the clutch element connected with the driving shaft serving to dissipate the energy of the liquid generated in the passages associated with the fulcrum member and also to guide the liquid to the passages associated with the driven member.

7. The combination with driving and driven shafts, of a planetary gearing associated therewith, said gearing including driving and driven members and an intermediate fulcrum member, and a hydraulic clutch connected with said gearing, said clutch including three elements, one of which is connected with said driving shaft, another with said driven shaft and the third one with said intermediate fulcrum member, each clutch element comprising a passaged head arranged in a manner that their passages constitute the circuit in which the liquid flows, the passages of the clutch element connected with the driving shaft serving to dissipate the energy of the liquid generated in the passages associated with the fulcrum member and also to guide the liquid to the passages associated with the driven member.

8. The combination with driving and driven shafts, of a gearing connecting the same, and an automatically acting hydraulic clutch for changing the normal speed of one element of the gearing in relation to other elements thereof whereby the same is caused to become the fulcrum for certain other elements of the gearing, said clutch including three members, one of which is connected with the element which becomes the fulcrum, another one with the driving shaft and the third one with the driven shaft, each clutch member comprising a passaged element, the passages of the three clutch members being arranged so as to form the whole circuit in which the liquid flows.

9. The combination with driving and driven shafts, of a planetary gearing connecting the same, and an automatically acting hydraulic clutch for changing the normal speed of one element of the gearing in relation to other elements thereof whereby the same is caused to become the fulcrum for certain other elements of the gearing, said clutch including three members, one of which is connected with the element which becomes the fulcrum, another one with the driving shaft and the third one with the driven shaft, each clutch member comprising a passaged element, the passages of the three clutch members being arranged so as to form the whole circuit in which the liquid flows.

10. The combination with driving and driven shafts, of a hydraulic clutch inserted therebetween, said clutch including three members, one of which is connected with said driving shaft, another one with said driven shaft and a third one interposed between said first two clutch members, and means actuated by the driving shaft for rotating said interposed member to impart energy to the liquid flowing therethrough.

11. The combination with driving and driven shafts, of a hydraulic clutch inserted therebetween, said clutch including two members in the form of centrifugal pump impellers juxtaposed to each other and a third member for guiding the liquid from one of said centrifugal pump impellers to the other, and means connected with said driving shaft for imparting rotation to one of said centrifugal pump impellers to induce a circulation of the liquid through said guiding member.

12. The combination with driving and driven shafts, of a hydraulic clutch inserted therebetween, said clutch including two members in the form of centrifugal pump impellers juxtaposed to each other and a third passaged member for guiding the liquid from one of said centrifugal pump impellers to the other, and means connected with said driving shaft for imparting rotation to one of said centrifugal pump impellers to induce a circulation of the liquid through said guiding member.

13. The combination with driving and driven shafts, of a liquid containing casing attached to said driving shaft, a gearing connecting said casing with said driven shaft, and an automatically acting clutch for causing one element of the gearing to become a fulcrum for certain other elements thereof, said clutch including three members, one of the members of the clutch comprising a plurality of passages in said casing and the other two members being juxtaposed to each other and to the said passages.

14. The combination with driving and driven shafts, of a liquid containing casing attached to said driving shaft, a planetary gearing connecting said casing with said driven shaft, and an automatically acting clutch for causing one element of the gearing to become a fulcrum for certain other elements thereof, said clutch including three members, one of the members of the clutch comprising a plurality of passages in said casing and the other two members being juxtaposed to each other and to the said passages.

15. The combination with driving and driven shafts, of a liquid containing casing attached to said driving shaft, a gearing connecting said casing with said driven shaft, and an automatically acting hydraulic clutch for changing the normal speed of one element of the gearing in relation to the other elements thereof, whereby the same is caused to become the fulcrum of certain other elements of the gearing, said clutch including three passaged members, one of which is connected with the element which becomes the fulcrum, another one with the casing and the third one with the driven shaft, the passages of the three members forming the whole circuit in which the liquid flows.

16. The combination with driving and driven shafts, of a liquid containing casing attached to said driving shaft, a planetary gearing connecting said casing with said driven shaft, and an automatically acting hydraulic clutch for changing the normal speed of one element of the gearing in relation to the other elements thereof, whereby the same is caused to become the fulcrum of certain other elements of the gearing, said clutch including three passaged members, one of which is connected with the element which becomes the fulcrum, another one with the casing and the third one with the driven shaft, the passages of the three members forming the whole circuit in which the liquid flows.

17. The combination with driving and driven shafts, of a liquid containing casing attached to said driving shaft, a gearing connecting said casing with said driven shaft, and an automatically acting hydraulic clutch for changing the normal speed of one element of the gearing in relation to the other elements thereof, whereby the same is caused to become the fulcrum of certain other elements of the gearing, said clutch including three passaged members, one of which is connected with the element which becomes the fulcrum, another one with the driven shaft and the third one being formed in the casing, the passages of the three members forming the whole circuit in which the liquid flows.

18. The combination with driving and driven shafts, of a substantially cylindrical casing attached to said driving shaft, a gearing connecting said casing with said driven shaft, and an automatically acting hydraulic clutch for causing one element of the gearing to become the fulcrum for certain other elements thereof, said clutch including three passaged members, one of which is connected with the element which becomes the fulcrum, another one with said driven shaft and the third one being formed in the inner face of the cylindrical portion of said casing, the passages of said three members forming the whole circuit in which the liquid flows.

19. A hydraulic clutch comprising three passaged rotatable members, the passages of said three members merging one into the other to form the whole circuit in which the liquid flows, said members being geared together.

20. The combination with driving and driven shafts, of a gearing connecting the same, and an automatically acting hydraulic clutch for causing one element of the gearing to become a fulcrum for certain other elements thereof, said clutch including three members each of which is connected with an element of said gearing, and means for controlling the flow of the liquid in said clutch.

21. The combination with driving and driven shafts, of a planetary gearing associated therewith, said gearing including driving and driven members and an intermediate fulcrum member, the driving member being connected with the driving shaft and the driven member of said gearing with said driven shaft, a hydraulic clutch connected with said gearing, said clutch including three elements, one of which is connected with said driving shaft, another one with said driven shaft and the third one with said intermediate fulcrum member, and means for controlling the flow of the liquid in said clutch.

22. The combination with driving and driven shafts, of a gearing associated therewith, said gearing including driving and driven members and an intermediate fulcrum member, a hydraulic clutch connected with said gearing, said clutch including three elements, one of which is connected with said driving shaft, another with said driven shaft and the third one with said intermediate fulcrum member, each clutch element comprising a passaged head arranged in a manner that their passages constitute the circuit in which the liquid flows, the passages of the clutch element connected with the driving shaft serving to dissipate the energy of the liquid generated in the passages associated with the fulcrum member and also to guide the liquid to the passages associated with the driven member, and means for controlling the flow of the liquid through the passages of said clutch elements.

23. The combination with driving and driven shafts, of a gearing connecting the same, an automatically acting hydraulic clutch for changing the normal speed of one element of the gearing in relation to other elements thereof whereby the same is caused to become the fulcrum for certain other elements of the gearing, said clutch including three members, one of which is connected with the element which becomes the fulcrum, another one with the driving shaft and the third one with the driven shaft, each clutch member comprising a passaged element, the passages of the three clutch members being arranged so as to form the whole circuit in which the liquid flows, and means for controlling the flow of the liquid in said circuit.

24. The combination with driving and driven shafts, of a hydraulic clutch inserted therebetween, said clutch including three members, one of which is connected with said driving shaft, another one with said driven shaft and a third one interposed between said first two clutch members, means actuated by the driving shaft for rotating said interposed member to impart energy to the liquid flowing therethrough, and means for controlling the flow of the liquid through said clutch.

25. The combination with driving and driven shafts, of a hydraulic clutch inserted therebetween, said clutch including two members in the form of centrifugal pump impellers juxtaposed to each other and a third member for guiding the liquid from one of said centrifugal pump impellers to the other, means connected with said driving shaft for imparting rotation to one of said centrifugal pump impellers to induce a circulation of the liquid through said guiding member, and means for controlling the circulation of the liquid.

26. The combination with driving and driven shafts, of a liquid containing casing attached to said driving shaft, a gearing connecting said casing with said driven shaft, an automatically acting clutch for causing one element of the gearing to become a fulcrum for certain other elements thereof, said clutch including three members, one of the members of the clutch comprising a plurality of passages in said casing and the other two members being juxtaposed to each other and to the said passages, and means for controlling the flow of the liquid in said clutch.

27. The combination with driving and driven shafts, of a liquid containing casing attached to said driving shaft, a gearing connecting said casing with said driven shaft, an automatically acting hydraulic clutch for changing the normal speed of one element of the gearing in relation to the other elements thereof, whereby the same is caused to become the fulcrum of certain other elements of the gearing, said clutch including three passaged members, one of which is connected with the element which becomes the fulcrum, another one with the casing and the third one with the driven shaft, the passages of the three members forming the whole circuit in which the liquid flows and means for controlling the flow of the liquid in the said circuit.

28. The combination with driving and driven shafts, of a liquid containing casing attached to said driving shaft, a gearing connecting said casing with said driven shaft, an automatically acting hydraulic clutch for changing the normal speed of one element of the gearing in relation to the other elements thereof, whereby the same is caused to become the fulcrum of certain other elements of the gearing, said clutch including three passaged members, one of which is connected with the element which becomes the fulcrum, another one with the driven shaft and the third one being formed in the casing, the passages of the three members forming the whole circuit in which the liquid flows, and means for controlling the flow of the liquid in the said circuit.

29. The combination with driving and driven shafts, of a substantially cylindrical casing attached to said driving shaft, a gearing connecting said casing with said driven shaft, an automatically acting hydraulic clutch for causing one element of the gearing to become the fulcrum for certain other elements thereof, said clutch including three passaged members, one of which is connected with the element which becomes the fulcrum, another one with said driven shaft, and the third one being formed in the inner face of the cylindrical portion of said casing, the passages of said three members forming the whole circuit in which the liquid flows, and means for controlling the flow of the liquid in the said circuit.

30. The combination with driving and driven shafts, of a gearing associated therewith, said gearing including driving and driven members and an intermediate fulcrum member, and a hydraulic clutch connected with said gearing, said clutch including three elements, one of which is connected with said driving shaft, another with said driven shaft and the third one with said intermediate fulcrum member, each clutch element comprising a passaged head arranged in a manner that their passages constitute the circuit in which the liquid flows, the passages of the clutch element connected with the driving shaft serving to dissipate the energy of the liquid generated in the passages associated with the fulcrum member and also to guide the liquid to the passages associated with the driven member, the clutch elements connected with the driven shaft and with the fulcrum member being shiftable in relation to the passages of the clutch element connected with the driving shaft, thereby regulating the flow of the liquid in the clutch.

31. The combination with driving and driven shafts, of a gearing associated therewith, said gearing including driving and driven members and an intermediate fulcrum member, and a hydraulic clutch connected with said gearing, said clutch including three elements, one of which is connected with said driving shaft, another with said driven shaft and the third one with said intermediate fulcrum member, each clutch element comprising a passaged head arranged in a manner that their passages constitute the circuit in which the liquid flows, the passages of the clutch element connected with the driving shaft serving to dissipate the energy of the liquid generated in the passages associated with the fulcrum member and also to guide the liquid to the passages associated with the driven shaft, the clutch elements connected with the driven shaft and with the fulcrum member being longitudinally shiftable in relation to the passages of the element connected with the driving shaft, thereby regulating the flow of the liquid in the clutch.

32. The combination with driving and driven shafts, of a gearing connecting the same, and an automatically acting hydraulic clutch for causing one element of the gearing to become a fulcrum for certain other elements thereof, said clutch including three members each of which is connected with an element of said gearing, two members of said clutch being shiftable in relation to the third one to vary the flow of the liquid through the clutch.

Signed at New York, in the county of New York and State of New York, this 2nd day of August, A. D. 1916.

CARLTON R. RADCLIFFE.